(12) United States Patent
Kong et al.

(10) Patent No.: US 12,079,796 B2
(45) Date of Patent: Sep. 3, 2024

(54) APPARATUS AND METHOD FOR MANAGING MOBILE TRANSACTION COUPON INFORMATION IN MOBILE TERMINAL

(71) Applicant: Samsung Electronics Co., Ltd., Suwon-si (KR)

(72) Inventors: Byung-Kwon Kong, Suwon-si (KR); Soon-Mi Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 16/792,649

(22) Filed: Feb. 17, 2020

(65) Prior Publication Data

US 2020/0184458 A1 Jun. 11, 2020

Related U.S. Application Data

(63) Continuation of application No. 16/148,881, filed on Oct. 1, 2018, now Pat. No. 10,565,581, which is a
(Continued)

(30) Foreign Application Priority Data

Feb. 10, 2011 (KR) .................. 10-2011-0011864

(51) Int. Cl.
*G06Q 20/00* (2012.01)
*G06Q 20/04* (2012.01)
*G06Q 20/32* (2012.01)
(52) U.S. Cl.
CPC ..... *G06Q 20/3274* (2013.01); *G06Q 20/0457* (2013.01)

(58) Field of Classification Search
None
See application file for complete search history.

(56) References Cited

U.S. PATENT DOCUMENTS 6,321,208 B1 11/2001 Barnett et al.
6,739,514 B2 5/2004 Sanders et al.
(Continued)

FOREIGN PATENT DOCUMENTS

JP 2003-281306 A 10/2003
JP 2005-056166 A 3/2005
(Continued)

OTHER PUBLICATIONS

Foreign Communication From a Related Counterpart Application, Korean Application No. 10-2001-0011864, Notice of Preliminary Rejection dated Feb. 14, 2017, 12 pages.
(Continued)

*Primary Examiner* — Belix M Ortiz Ditren

(57) ABSTRACT

An apparatus and a method manage a received mobile transaction coupon in a mobile terminal. The apparatus includes a communication unit, an information analyzer, a schedule manager, an output unit, and a controller. The communication unit receives a mobile transaction coupon. The information analyzer obtains the received mobile transaction coupon information. The schedule manager registers the obtained mobile transaction coupon information in an alarm program. The output unit outputs the registered mobile transaction coupon information on a relevant date via the alarm program. The controller controls to register the mobile transaction coupon information in the alarm program, and controls to store the received mobile transaction coupon in a storage area corresponding to a reception type or a folder for a widget function.

19 Claims, 9 Drawing Sheets

Related U.S. Application Data continuation of application No. 13/370,209, filed on Feb. 9, 2012, now Pat. No. 10,089,616.

(56) References Cited

U.S. PATENT DOCUMENTS

| | | |
|---|---|---|
| 7,934,641 B2 | 5/2011 | Melick et al. |
| 7,991,694 B2 | 8/2011 | Takayama |
| 8,532,572 B2 | 9/2013 | Renard et al. |
| 2002/0060246 A1 | 5/2002 | Gobburu et al. |
| 2002/0091571 A1 | 7/2002 | Thomas et al. |
| 2002/0116271 A1 | 8/2002 | Mankoff |
| 2002/0151294 A1 | 10/2002 | Kirby et al. |
| 2004/0263486 A1 | 12/2004 | Seni |
| 2005/0234771 A1 | 10/2005 | Register et al. |
| 2007/0011099 A1 | 1/2007 | Sheehan |
| 2007/0156513 A1 | 7/2007 | Mastrianni et al. |
| 2007/0203792 A1 | 8/2007 | Rao |
| 2008/0097851 A1 | 4/2008 | Bemmel et al. |
| 2008/0140520 A1* | 6/2008 | Hyder ............... G06Q 30/0207 |
| | | 705/14.1 |
| 2008/0262928 A1 | 10/2008 | Michaelis |
| 2008/0267504 A1 | 10/2008 | Schloter et al. |
| 2009/0061884 A1 | 3/2009 | Rajan et al. |
| 2009/0070186 A1 | 3/2009 | Buiten et al. |
| 2009/0256731 A1 | 10/2009 | Matsuo et al. |
| 2010/0008478 A1 | 1/2010 | Arao et al. |
| 2010/0010964 A1 | 1/2010 | Skowronek et al. |
| 2010/0057624 A1 | 3/2010 | Hurt et al. |
| 2010/0125495 A1 | 5/2010 | Smith et al. |
| 2010/0213253 A1* | 8/2010 | Wollbrand ............ G06Q 20/363 |
| | | 235/492 |
| 2011/0307315 A1 | 12/2011 | Cai et al. |
| 2012/0054014 A1 | 3/2012 | Cho et al. |
| 2012/0179525 A1 | 7/2012 | Seguin et al. |
| 2013/0080241 A1* | 3/2013 | Fisher .................... G06Q 20/16 |
| | | 705/14.38 |

FOREIGN PATENT DOCUMENTS

| | | |
|---|---|---|
| JP | 2008-186047 A | 8/2008 |
| KR | 10-2006-0099997 A | 9/2006 |
| KR | 100766591 B1 | 10/2007 |
| KR | 10-2008-0020153 A | 3/2008 |
| KR | 10-2009-0027953 A | 3/2009 |
| KR | 10-2010-0007063 A | 1/2010 |

OTHER PUBLICATIONS

Notice of Final Rejection dated Aug. 28, 2017 in connection with Korean Patent Application No. 10-2011-0011864, 10 pages.
Notice of Patent Grant dated Oct. 13, 2017 in connection with Korean Patent Application No. 10-2011-0011864, 3 bages.

* cited by examiner

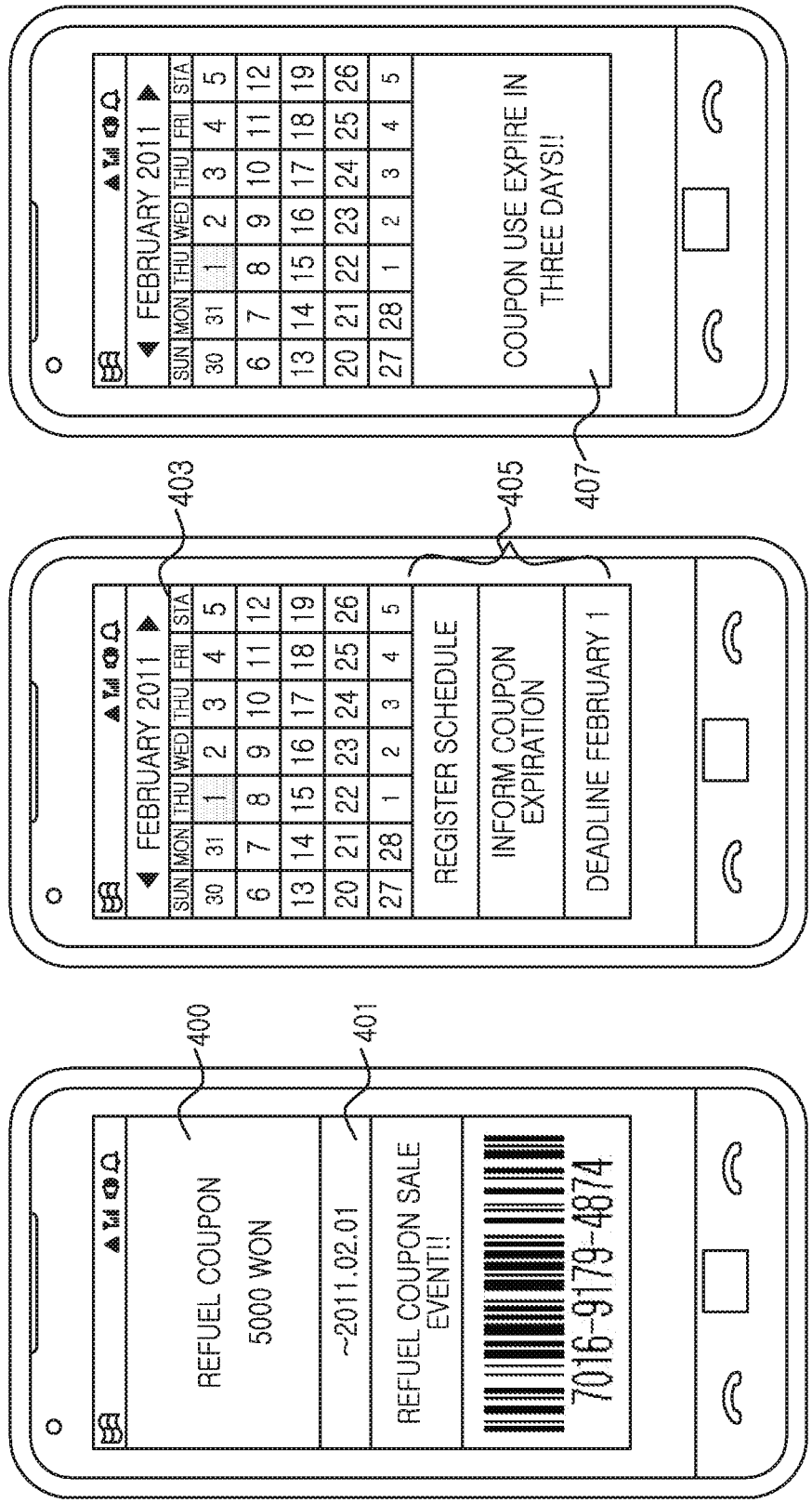

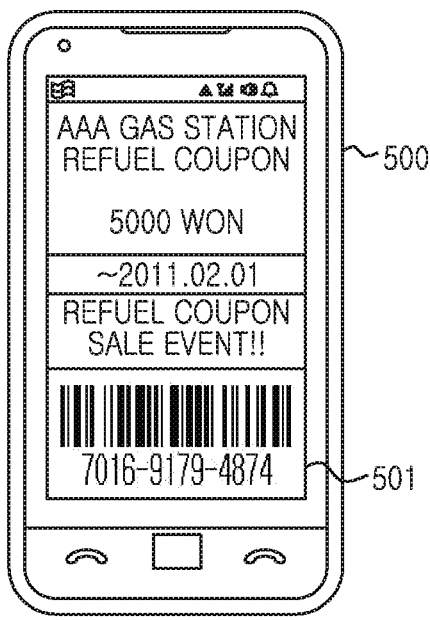
FIG.5A
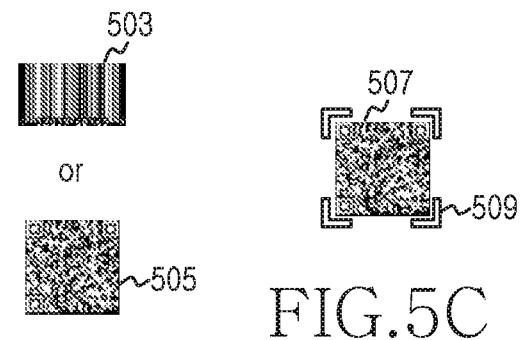
FIG.5B
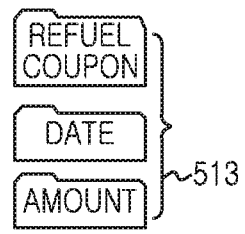
FIG.5C
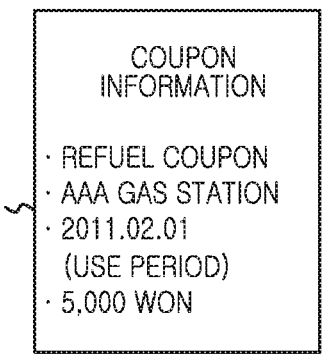
FIG.5D
FIG.5E
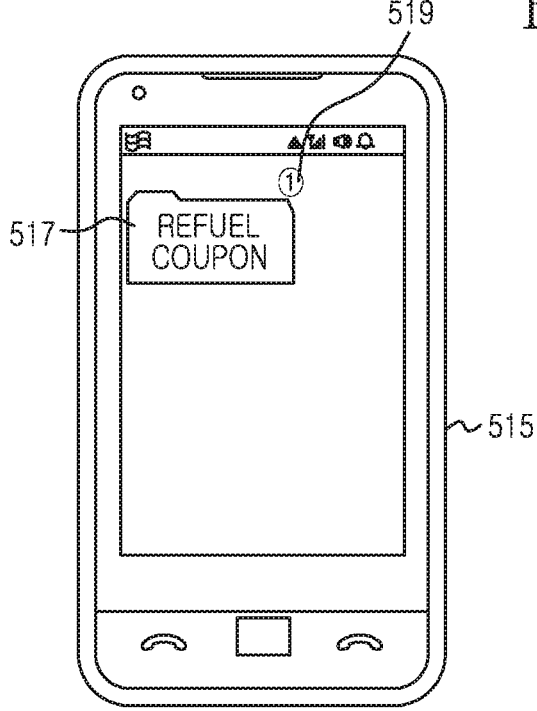
FIG.5F
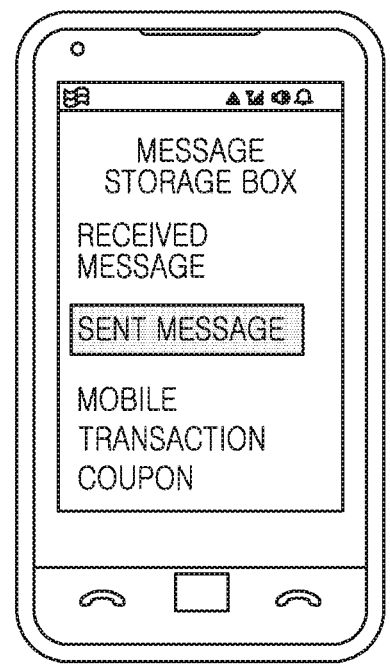
FIG.5G

APPARATUS AND METHOD FOR MANAGING MOBILE TRANSACTION COUPON INFORMATION IN MOBILE TERMINAL

CROSS-REFERENCE TO RELATED APPLICATIONS

This application is a continuation of U.S. patent application Ser. No. 16/148,881, filed Oct. 1, 2018, which is a continuation of U.S. patent application Ser. No. 13/370,209, filed Feb. 9, 2012, now U.S. Pat. No. 10,089,616, which is based on and claims priority under 35 U.S.C. § 119 to Korean Patent Application No. 10-2011-0011864, filed Feb. 10, 2011, the disclosures of which are hereby incorporated by reference in their entirety.

BACKGROUND

1. Field

The present disclosure relates to an apparatus and a method for managing a received mobile transaction coupon in a mobile terminal. More particularly, the present disclosure relates to an apparatus and a method for registering information regarding a received mobile transaction coupon in an alarm program, and allowing a user to use the mobile transaction coupon before a use period expires in a mobile terminal. In addition, the present disclosure relates to an apparatus and a method for classifying and storing received mobile transaction coupons according to a category to improve a mobile transaction coupon manage performance.

2. Description of Related Art

Recently, a mobile terminal has become a necessity indispensable to modern people and is used regardless of age or gender, and service providers and terminal manufacturers competitively develop a product (or a service) for differentiation from other companies.

For example, the mobile terminal has developed to a multimedia apparatus that can provide a phonebook, games, a Short Message Service (SMS), an Electronic (E)-mail, a morning call, a Motion Picture Expert Group Audio Layer-3 (MP3) player, a schedule management function, a digital camera, a multimedia message and a wireless Internet service, to provide various services.

Recently, instead of a paper transaction coupon that is printed on paper having a predetermined size and provided, an electronic transaction coupon is provided via the Internet. To use the electronic transaction coupon, a user prints the electronic transaction coupon via an output unit such as a printer or shows an electronic transaction coupon output on a mobile terminal screen to a seller to purchase a relevant product, so that the electronic transaction coupon is also called a mobile transaction coupon. Here, the mobile transaction coupon includes an electronic gift certificate, an electronic discount coupon, and an electronic ticket. A user may exchange an item using the mobile transaction coupon, change a payment money for purchase of an item, or enter a physical space or use a transportation means using the mobile transaction coupon instead of an airline ticket, a movie ticket, a performance ticket, a train ticket, etc.

The mobile transaction coupon may include an identify code and an identify character including information regarding the mobile transaction coupon.

The identify code is an image code used for determining validity of the mobile transaction coupon. Generally, a bar code is used as the identify code, and the identify character includes a type (for example, a gift certificate, a discount coupon, a ticket, etc.) of a mobile transaction coupon, a use period, cautions for use, etc.

However, as a mobile transaction coupon is diversified and the number of mobile transaction coupons increases, a user stores a plurality of mobile transaction coupons in a mobile terminal and the user should determine each mobile transaction coupon and use a mobile transaction coupon required for product purchase.

At this point, in the case where the user was not able to use a mobile transaction coupon within a use period, the mobile transaction coupon whose use period has expired becomes an invalid transaction coupon.

Generally, the mobile transaction coupon is a coupon that a user purchases by paying a predetermined amount of money. When the use period expires, a monetary loss occurs.

In addition, generally, the mobile terminal stores a received mobile transaction coupon in a predetermined storage folder by receiving the mobile transaction coupon in a message format (for example, a short message, a multimedia message, an electronic mail message, etc.).

For example, when the mobile terminal receives a mobile transaction coupon using a short message, the received mobile transaction coupon is stored in a message storage area. However, a reception message list of the mobile terminal is sorted in a rising order for a reception time. When an amount of messages transmitted/received by a user is large, a sequence of the received mobile transaction coupon is pushed to a lower ranking of the reception message list. Therefore, a user of the mobile terminal has an inconvenience of having to perform a repeated scroll operation and view an item of the reception message list in order to view a mobile transaction coupon stored in advance.

Therefore, to solve the above problem, an apparatus and a method for managing a mobile transaction coupon in a mobile terminal are required.

SUMMARY

To address the above-discussed deficiencies of the prior art, it is a primary object to provide at least the advantages described below. Accordingly, an aspect of the present disclosure is to provide an apparatus and a method for managing mobile transaction coupon information in a mobile terminal.

Another aspect of the present disclosure is to provide an apparatus and a method for registering mobile transaction coupon information in an alarm program in a mobile terminal.

Still another aspect of the present disclosure is to provide an apparatus and a method for providing a use period of a mobile transaction coupon via an alarm program in a mobile terminal.

Yet another aspect of the present disclosure is to provide an apparatus and a method for classifying and storing mobile transaction coupons for each category in a mobile terminal.

Still yet another aspect of the present disclosure is to provide an apparatus and a method for determining a storage folder corresponding to a category using code information or text information of a mobile transaction coupon in a mobile terminal.

In accordance with an aspect of the present disclosure, an apparatus for managing a mobile transaction coupon in a mobile terminal is provided. The apparatus includes a communication unit for receiving a mobile transaction coupon, an information analyzer for obtaining the received mobile transaction coupon information, a schedule manager for registering the obtained mobile transaction coupon information in an alarm program, an output unit for outputting the registered mobile transaction coupon information on a relevant date via the alarm program, a memory unit for storing the mobile transaction coupon, and a controller for controlling to register the mobile transaction coupon information in the alarm program, and controlling to store the received mobile transaction coupon in a storage area corresponding to a reception type or a folder for a widget function, wherein the storage area corresponding to the reception type includes at least one of a message storage box and an electronic mail storage area, and the controller stores mobile transaction coupons of the same characteristic as a group in the storage area or the folder.

In accordance with another aspect of the present disclosure, a method for managing a mobile transaction coupon in a mobile terminal is provided. The method includes receiving a mobile transaction coupon, analyzing the received mobile transaction coupon to obtain mobile transaction coupon information, registering the obtained mobile transaction coupon information in an alarm program, outputting the registered mobile transaction coupon information on a relevant date via the alarm program, and storing the received mobile transaction coupon in a storage area corresponding to a reception type or a folder for a widget function, wherein the storage area corresponding to the reception type includes at least one of a message storage box and an electronic mail storage area, and mobile transaction coupons of the same characteristic are stored as a group in the storage area or the folder.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following description taken in conjunction with the accompanying drawings in which:

FIG. 4A illustrates a screen that has received a refuel coupon in a mobile terminal according to an exemplary embodiment of the present disclosure;

FIG. 4B illustrates a screen for registering a use period of a refuel coupon at a schedule function in a mobile terminal according to an exemplary embodiment of the present disclosure;

FIG. 4C illustrates a screen for performing a function of informing a use period of a refuel coupon in a mobile terminal according to an exemplary embodiment of the present disclosure;

FIG. 5A illustrates a screen of receiving a mobile transaction coupon in a mobile terminal according to an exemplary embodiment of the present disclosure;

FIG. 5B illustrates code information for determining mobile transaction coupon information in a mobile terminal according to an exemplary embodiment of the present disclosure;

FIG. 5C illustrates a process for recognizing code information in order to obtain mobile transaction coupon information according to an exemplary embodiment of the present disclosure;

FIG. 5D illustrates a screen of obtaining mobile transaction coupon information in a mobile terminal according to an exemplary embodiment of the present disclosure;

FIG. 5E illustrates a folder for storing a mobile transaction coupon in a mobile terminal according to an exemplary embodiment of the present disclosure;

FIG. 5F illustrates a screen of storing a mobile transaction coupon in a mobile terminal according to an exemplary embodiment of the present disclosure;

FIG. 5G illustrates a screen of storing a mobile transaction coupon in a mobile terminal according to an exemplary embodiment of the present disclosure;

Throughout the drawings, like reference numerals will be understood to refer to like parts, components and structures.

DETAILED DESCRIPTION

FIGS. 1 through 7F, discussed below, and the various embodiments used to describe the principles of the present disclosure in this patent document are by way of illustration only and should not be construed in any way to limit the scope of the disclosure.

Exemplary embodiments of the present disclosure provide an apparatus and a method for registering mobile transaction coupon information in an alarm program, and providing the mobile transaction coupon information via the alarm program before the use period of the mobile transaction coupon expires in a mobile terminal. In addition, exemplary embodiments of the present disclosure provide an apparatus and a method for storing a received mobile transaction coupon for each type (a gift card, a ticket, a coupon, etc.), or providing a function of sorting received mobile transaction coupons (sorting for each type, sorting for each deadline, etc.) in a mobile terminal.

In addition, in the following description, a mobile transaction coupon denotes a transaction means including an electronic gift certificate, an electronic discount coupon, and an electronic ticket. Here, the gift certificate denotes a means that can be exchanged with a goods corresponding to a face value. A user may purchase the gift certificate via payment in advance (pay (card payment, cyber money payment, account transfer, etc.)/free), or may be provided with the gift certificate via a promotion event. The type of the gift certificate includes a gift certificate for culture, a department store gift certificate, a food service gift certificate, a shoe gift certificate, a refuel coupon, a book gift certificate, etc. In addition, the discount coupon denotes a means of changing a payment price with a priority coupon applied to payment of goods. A user may purchase goods together with a different payment means. In addition, the electronic ticket replaces qualification that can do a specific thing, and denotes a means allowing entry for a specific space and use of a specific item. The electronic ticket may be a performance ticket, a movie ticket, a public transportation ticket, an amusement park entry ticket, a pleasure dome use ticket, etc.

Of course, the gift certificate, the ticket, and the discount coupon are different from one another in a dictionary meaning, but the present disclosure defines all means that can serve as a portion of a payment means required for commercial transaction as a mobile transaction coupon.

Figure 1:
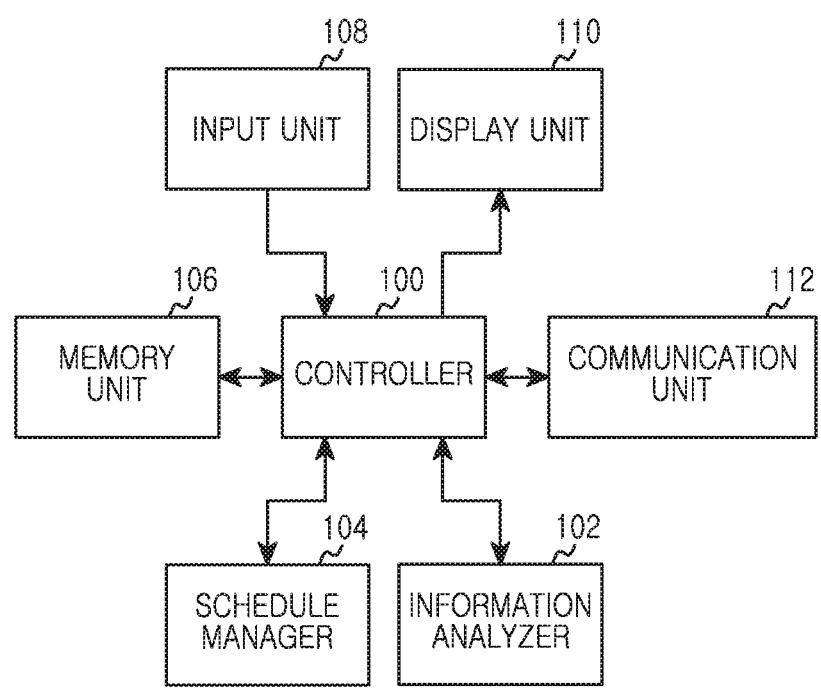
FIG. 1 illustrates a mobile terminal that provides mobile transaction coupon information according to an exemplary embodiment of the present disclosure.

FIG. 1 illustrates a mobile terminal that provides mobile transaction coupon information according to an exemplary embodiment of the present disclosure.

Referring to FIG. 1, the mobile terminal may include a controller 100, an information analyzer 102, a schedule manager 104, a memory unit 106, an input unit 108, a display unit 110, and a communication unit 112.

First, the controller 100 of the mobile terminal controls an overall operation of the mobile terminal. For example, the controller 100 performs processes and controls for voice communication and data communication. In addition to the general functions, according to an exemplary embodiment of the present disclosure, the controller 100 analyzes information included in a received mobile transaction coupon to process to register the information in an alarm program.

For example, the controller 100 prevents a mobile transaction coupon from being discarded due to expiration of a use period by confirming the use period included in the mobile transaction coupon and registering the same in the alarm program.

In addition, the controller 100 may analyze code information or text information included in a received mobile transaction coupon to obtain information (the type, a category, a reservation time, a valid period, etc. of a transaction coupon) regarding the mobile transaction coupon. The controller 100 processes to determine a storage folder for the mobile transaction coupon depending on the obtained transaction coupon information.

Furthermore, the controller 100 processes to store a received mobile transaction coupon in a storage area corresponding to a reception type. That is, when receiving a mobile transaction coupon in the form of a message, the controller 100 processes to store the received mobile transaction coupon in a mobile transaction coupon storage area of a message storage box. When receiving a mobile transaction coupon in the form of an electronic mail, the controller 100 processes to store the received mobile transaction coupon in a mobile transaction coupon storage area of a mail storage box. The mobile transaction coupon storage area of the message storage box or the mail storage box is a storage area generated according to an exemplary embodiment of the present disclosure. The mobile transaction coupon storage area may be generated with a different name depending on a user's selection, or may be generated with an arbitrary name by the controller 100.

The information analyzer 102 of the mobile terminal analyzes a received mobile transaction coupon to determine transaction coupon information under control of the controller 100. That is, the information analyzer 102 includes a module capable of recognizing code information or text information, and determines information (a title, a use period, sum of money, etc. of a mobile transaction coupon) of the received mobile transaction coupon using the module to provide the information to the controller 100. At this point, the information determined by the information analyzer 102 may be used when the mobile transaction coupon information is registered in an alarm program or a storage folder is viewed. In addition, the information analyzer 102 detects a reception type of the received mobile transaction coupon to provide the same to the controller 100 under control of the controller 100.

The schedule manager 104 of the mobile terminal processes to register information of the mobile transaction coupon in the alarm program under control of the controller 100. For example, the schedule manager 104 may add a use period of the received mobile transaction coupon to an alarm or schedule function. The schedule manager 104 may register the mobile transaction coupon information in the alarm program to inform that a use period is imminent a predetermined term before the use period expires.

The memory unit 106 of the mobile terminal includes Read Only Memory (ROM), Random Access Memory (RAM), and a flash ROM. The ROM may store microcodes of programs for processes and controls of the controller 100, the information analyzer 102, and the schedule manager 104, and various reference data.

The RAM serves as a working memory of the controller 100 and stores temporary data that occur during execution of various programs. In addition, the flash ROM stores various updatable data for storage such as a phonebook, calling messages, received messages, and information of a user's touch input point. Furthermore, according to an exemplary embodiment of the present disclosure, the memory unit 106 stores a mobile transaction coupon classified for each category using mobile transaction coupon information. According to an exemplary embodiment of the present disclosure, the memory unit 106 may be a storage area corresponding to a reception type of a mobile transaction coupon.

The input unit 108 includes a plurality of function keys such as numerical key buttons of 0 to 9, a menu button, a cancel button, an OK button, a TALK button, an END button, an Internet access button, navigation key (directional key) buttons, letter input keys, etc., and provides key input data corresponding to a key pressed by a user to the controller 100. According to an exemplary embodiment of the present disclosure, the input unit 108 may generate input data corresponding to information of a mobile transaction coupon registered in the alarm program.

The display unit 110 displays status information generated during an operation of the mobile terminal, a limited number of characters, a large amount of moving images and still images, etc. According to an exemplary embodiment of the present disclosure, the display unit 110 outputs information (for example, outputs a notice of a use period of a mobile transaction coupon) of a mobile transaction coupon stored in advance and an item of a mobile transaction coupon. The display unit 110 may be a color Liquid Crystal Display (LCD), an Active-Matrix Organic Light-Emitting Diode (AMOLED), etc. The display unit 110 may include a touch input device, and when the display unit 110 is applied to a touch input type mobile terminal, the display unit 110 can be used as an input unit.

The communication unit 112 transmits/receives a Radio Frequency (RF) signal of data input/output via an antenna (not shown). For example, during transmission, the communication unit 112 channel-codes and spreads data to be transmitted, and then performs an RF process on the signal to transmit the signal. During reception, the communication unit 112 converts a received RF signal into a baseband signal, and despreads and channel-decodes the baseband signal to recover data. In addition, the communication unit 112 receives a mobile transaction coupon provided to a user via a purchase or present function.

The functions of the information analyzer 102 and the schedule manager 104 may be performed by the controller 100 of the mobile terminal. The separate configuration and illustration of the information analyzer 102 and the schedule manager 104 are an exemplary purpose only for inconvenience in description, not for limiting the scope of the present disclosure. It would be obvious to those skilled in the art that various modifications may be made within the scope of the present disclosure. For example, all functions of the information analyzer 102 and the schedule manager 104 may be processed by the controller 100.

Figure 2:
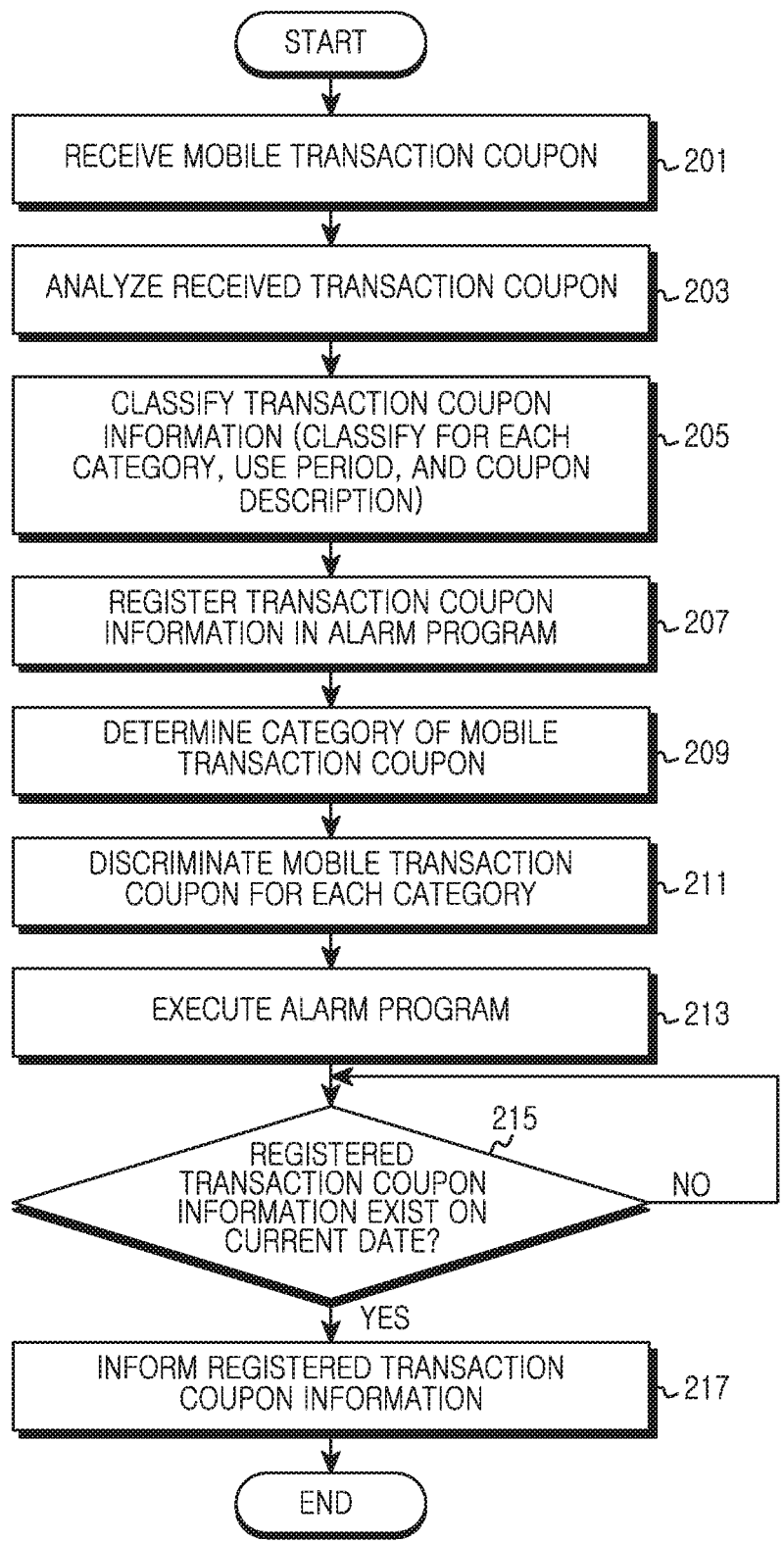
FIG. 2 illustrates a process for providing mobile transaction coupon information in a mobile terminal according to an exemplary embodiment of the present disclosure.

FIG. 2 illustrates a process for providing mobile transaction coupon information in a mobile terminal according to an exemplary embodiment of the present disclosure.

Referring to FIG. 2, the mobile terminal receives a mobile transaction coupon in step 201. Here, the mobile transaction coupon is provided as a payment means (a gift certificate, a discount coupon, a ticket, etc.) that can be used on-line or off-line via the mobile terminal. The mobile transaction coupon includes image code information and text information. The image code information denotes code information (for example, Quick Response (QR) code information, and bar code information) detected when the mobile transaction coupon is used. The text information denotes description regarding the mobile transaction coupon. In addition, the mobile transaction coupon may be purchased via a user's payment procedure (for example, card payment, cyber money payment, account transfer, etc.), or may be provided via a promotion event. The mobile transaction coupon includes a discount coupon used when a user purchases a product, and an electronic ticket giving qualification for a specific event (performance, movie, public transportation, an amusement part, and a pleasure dome) besides a mobile gift certificate. In the present disclosure, the mobile transaction coupon may include any means that may serve as a portion of a payment means required for commercial transaction.

The mobile terminal proceeds to step 203 to analyze the received mobile transaction coupon information, and then proceeds to step 205 to classify the analyzed transaction coupon information. At this point, the mobile terminal classifies the transaction coupon information by analyzing a type, a use period, a scheduled use date, description, a price, etc. of the received mobile transaction coupon.

The mobile terminal proceeds to step 207 to process to register one of the transaction coupon information analyzed in step 205 in the alarm program. Here, the alarm program may be a schedule program, an alarm clock, a calendar function, etc. For example, the mobile terminal may add a use period of the mobile transaction coupon to the calendar function, or add a use scheduled date of the mobile transaction coupon to an alarm program to recognize information regarding the mobile transaction coupon via the alarm function during a set period.

The mobile terminal proceeds to step 209 to determine the category of the mobile transaction coupon received in step 201. That is, the mobile terminal determines the mobile transaction coupon information analyzed in step 203 to determine whether the received mobile transaction coupon is a gift certificate (a refuel coupon, a medical care gift certificate, a food service gift certificate, a book gift certificate, a culture gift certificate, a department store gift certificate, etc.), a discount coupon, or a ticket (a performance ticket, a movie ticket, a public transportation ticket, an amusement part entry ticket, a pleasure dome use ticket, etc.).

The mobile terminal proceeds to step 211 to determine a storage position of the mobile transaction coupon using the category of the determined mobile transaction coupon, and stores the mobile transaction coupon in the determined position. That is, the mobile terminal may generate a folder for each of a plurality of categories, and may only store mobile transaction coupons of the same category in the folder. Furthermore, the mobile terminal may store the mobile transaction coupons for each use period and each use scheduled date besides the category.

The mobile terminal proceeds to step 213 to execute an alarm program. According to an exemplary embodiment of the present disclosure, the mobile terminal may execute a schedule function in step 213 in order to inform a valid period of a mobile transaction coupon via the schedule function.

The mobile terminal proceeds to step 215 to detect schedule information set at the schedule function to determine whether mobile transaction coupon information registered on a current date exists.

When determining that the mobile transaction coupon information registered on the current date does not exist in step 215, the mobile terminal re-performs the process of step 215.

In contrast, when determining that the mobile transaction coupon information registered on the current date exists in step 215, the mobile terminal proceeds to step 217 to allow a user to recognize the valid period of the mobile transaction coupon by informing the mobile transaction coupon information registered on the current date.

At this point, the mobile terminal may allow the user to recognize that the valid period of the mobile transaction coupon will expire soon a predetermined time before the valid period of the mobile transaction coupon expires (for example, three days before).

After that, the mobile terminal ends the present algorithm.

Figure 3:
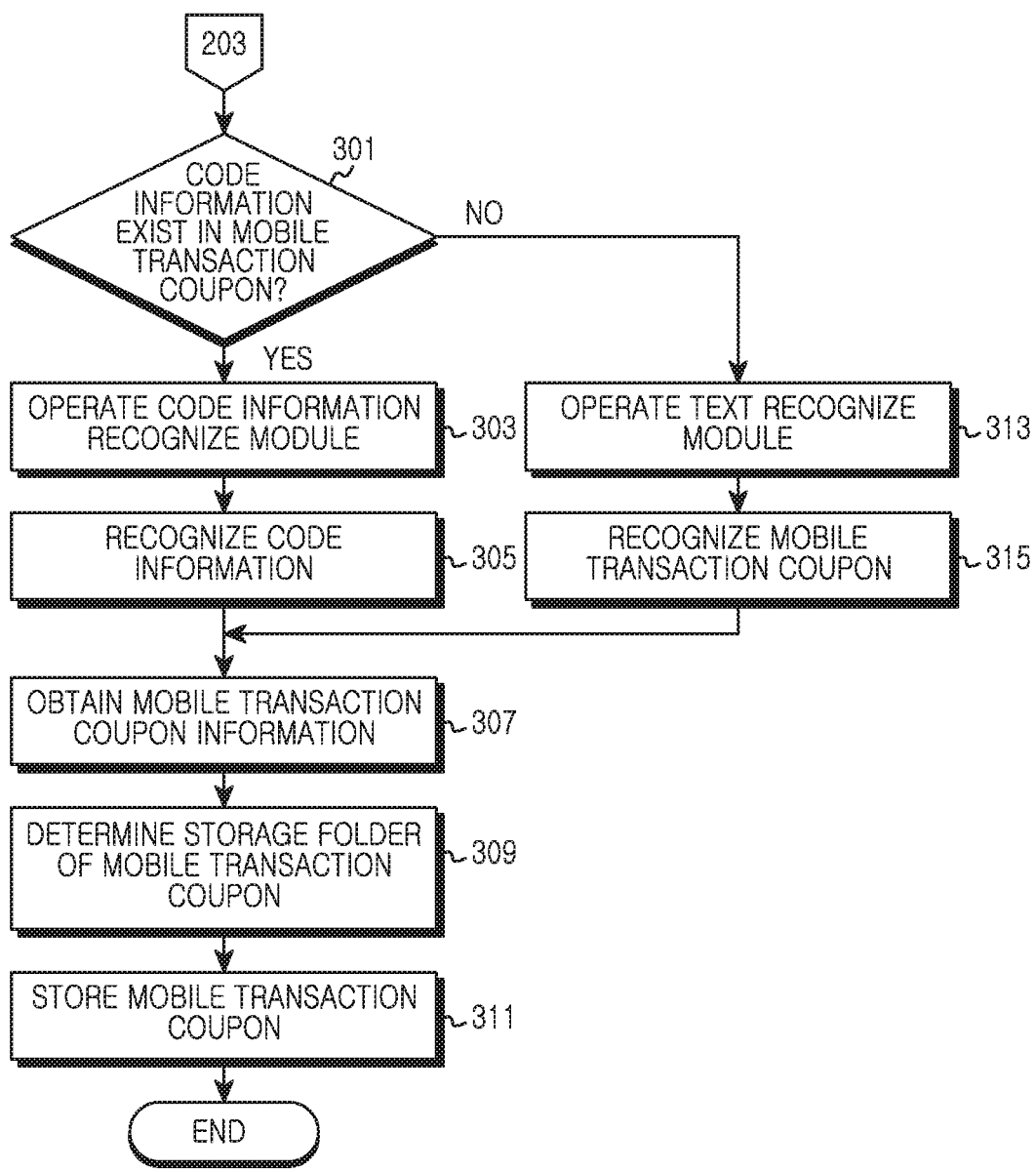
FIG. 3 illustrates a process for analyzing mobile transaction coupon information in a mobile terminal according to an exemplary embodiment of the present disclosure.

FIG. 3 illustrates a process for analyzing mobile transaction coupon information in a mobile terminal according to an exemplary embodiment of the present disclosure.

Referring to FIG. 3, as described above, the mobile transaction coupon includes image code information and text information. According to an exemplary embodiment of the present disclosure, the mobile terminal may detect the code information and the text information to analyze mobile transaction coupon information.

As described above, the mobile terminal for analyzing the mobile transaction coupon information determines whether image code information exists in a received mobile transaction coupon in step 301.

When determining that code information exists in the mobile transaction coupon in step 301, the mobile terminal proceeds to step 303 to operate a code information recognize module. Here, the code information recognize module denotes a camera module for detecting code information included in the mobile transaction coupon or an application for detecting code information.

The mobile terminal proceeds to step 305 to recognize code information included in the mobile transaction coupon. At this point, the mobile terminal may output a code information recognize region of a predetermined size and then move a recognize region output in advance according to a user's selection to recognize code information. In addition, according to an exemplary embodiment of the present disclosure, the mobile terminal may move the recognize region with a predetermined interval to recognize code information without the user's selection.

The mobile terminal proceeds to step 307 to obtain mobile transaction coupon information included in the recognized code information, and proceeds to step 309 to determine a storage folder of the mobile transaction coupon. That is, when storing the mobile transaction coupon for each category, the mobile terminal determines the obtained mobile transaction coupon information to detect the category of the mobile transaction coupon. After that, the mobile terminal determines a storage folder corresponding to the category of the detected mobile transaction coupon.

The mobile terminal proceeds to step 311 to store the mobile transaction coupon in a relevant folder.

In contrast, when determining that the code information does not exist in the mobile transaction coupon in step 301, in other words, when determining only text information exists, the mobile terminal proceeds to step 313 to operate a text recognize module. Here, the text recognize module denotes an application for detecting text data included in the mobile transaction coupon.

The mobile terminal proceeds to step 315 to detect text of the mobile transaction coupon, and proceeds to step 307 to obtain mobile transaction coupon information included in the detected text information.

The mobile terminal proceeds to step 309 to determine a storage folder of the mobile transaction coupon and proceeds to step 311 to store the mobile transaction coupon in the relevant folder. At this point, the mobile terminal stores the mobile transaction coupon in a specific folder of a wallpaper, and may apply a widget function to the storage folder or generate a specific folder in a message storage area and store the mobile transaction coupon in the generated specific folder.

After that, the mobile terminal ends the present algorithm.

FIGS. 4A-C illustrate a process for registering a use period of a refuel coupon at a schedule function in a mobile terminal according to an exemplary embodiment of the present disclosure. Here, the refuel coupon is described as an example of a mobile transaction coupon including a train ticket, a movie ticket, a department store gift certificate, a goods discount coupon, etc.

FIG. 4A illustrates a screen that has received a refuel coupon in a mobile terminal according to an exemplary embodiment of the present disclosure.

Referring to FIG. 4A, the mobile terminal receives and outputs a refuel coupon purchased or provided free. At this point, the mobile transaction coupon includes image code information (for example, QR code and bar code information) and text information. The code information and the text information denote information of the refuel coupon. That is, the refuel coupon provides contents 400 informing a refuel coupon and use period information 401 corresponding to a use period of the refuel coupon using text information and bar code information. Generally, a user of the mobile terminal should view the text information to use the refuel coupon within the use period. When the user of the mobile terminal does not use the refuel coupon within the use period, the refuel coupon becomes an invalid gift certificate.

FIG. 4B illustrates a screen for registering a use period of a refuel coupon at a schedule function in a mobile terminal according to an exemplary embodiment of the present disclosure.

Referring to FIG. 4B, the mobile terminal analyzes a received refuel coupon to determine the use period of the refuel coupon as in FIG. 4A. At this point, the mobile terminal may obtain information (for example, a use period, a refuel coupon category, etc.) of the refuel coupon by detecting the text information or the code information of the refuel coupon.

After that, the mobile terminal sets a schedule 403 informing a refuel coupon use on a data corresponding to the determined use period.

For example, before the use period expires (for example, three days before expiration), the mobile terminal may induce a user to use the refuel coupon by allowing the user to recognize that the use period of the refuel coupon will expire soon.

As described above, the mobile terminal performs a schedule register process by adding a schedule title (coupon end notice) and schedule contents 405 (use period information) to a date corresponding to the use period or a relevant date before the use period expires.

FIG. 4C illustrates a screen for performing a function of informing a use period of a refuel coupon in a mobile terminal according to an exemplary embodiment of the present disclosure.

Referring to FIG. 4C, the mobile terminal registers the use period of the refuel coupon in a schedule function as in FIG. 4B, and determines whether a use period set on a current date exists. At this point, the mobile terminal performs a general schedule function or a general alarm program.

When the use period set on the current date exists, the mobile terminal outputs a message 407 informing that the use period of the refuel coupon is imminent. At this point, the mobile terminal may inform that the use period is imminent using an audio signal and a text signal set in advance.

FIGS. 5A-G illustrate a screen of managing information regarding a mobile transaction coupon received in a mobile terminal according to an exemplary embodiment of the present disclosure.

FIG. 5A illustrates a screen of receiving a mobile transaction coupon in a mobile terminal according to an exemplary embodiment of the present disclosure.

Referring to FIG. 5A, the mobile terminal 500 receives and outputs a refuel coupon 501 purchased or provided free. At this point, the mobile transaction coupon includes image code information (for example, QR code and bar code information) and text information. The code information and the text information denote information of the refuel coupon. That is, the refuel coupon includes text information such as contents informing five thousand won-refuel coupon of an AAA gas station and valid period information corresponding to the use period of the refuel coupon, and bar code information. Generally, a user of the mobile terminal should view the text information to use the refuel coupon within the use period. When the user of the mobile terminal does not use the refuel coupon within the use period, the refuel coupon becomes an invalid gift certificate.

To prevent the refuel coupon from being unused within the use period, the mobile terminal 500 according to an exemplary embodiment of the present disclosure analyzes information of a received mobile transaction coupon and registers the information in an alarm program or classifies and stored the information in a specific storage space. That is, the mobile terminal recognizes the text information of the mobile transaction coupon or recognizes the code information to analyze the information.

FIG. 5B illustrates code information for determining mobile transaction coupon information in a mobile terminal according to an exemplary embodiment of the present disclosure.

Referring to FIG. 5B, the mobile terminal determines whether code information exists in order to obtain mobile transaction coupon information. At this point, the mobile terminal determines whether bar code information 503 or QR code information 505 included in the received mobile transaction coupon exists.

FIG. 5C illustrates a process for recognizing code information in order to obtain mobile transaction coupon information according to an exemplary embodiment of the present disclosure.

Referring to FIG. 5C, the code information is image information including information regarding the mobile transaction coupon such as the illustrated QR code information, and includes bar code information.

First, the mobile terminal operates a code information recognize module (application) to detect code information 507 of the received mobile transaction coupon. That is, the mobile terminal allows the code information 507 to be located in a recognize region 509 that recognizes the code information. FIG. 5C determines mobile transaction coupon information using the code information. The mobile terminal uses a text recognize function when determining the mobile transaction coupon information using the text information.

FIG. 5D illustrates a screen of obtaining mobile transaction coupon information in a mobile terminal according to an exemplary embodiment of the present disclosure.

Referring to FIG. 5D, the mobile terminal may recognize code information as in FIG. 5C to analyze information of the received mobile transaction coupon. That is, as illustrated, the mobile terminal may obtain information 511 saying that the received mobile transaction coupon is a refuel coupon, the mobile transaction coupon is a coupon that can be used at an AAA gas station, the use period is 2011.02.01, and an amount is 5,000. The above obtained information may be used for determining a storage folder of the received mobile transaction coupon or used as information to be registered in an alarm program.

FIG. 5E illustrates a folder for storing a mobile transaction coupon in a mobile terminal according to an exemplary embodiment of the present disclosure.

Referring to FIG. 5E, the mobile terminal may determine a storage folder of a mobile transaction coupon using the determined mobile transaction coupon information as in FIG. 5D. That is, the mobile terminal may generate a refuel coupon folder corresponding to the transaction coupon information, a relevant date (use expire date) folder, an amount folder 513, and select at least one of the generated folders and store the mobile transaction coupon for the refuel coupon in the selected folder.

FIG. 5F illustrates a screen of storing a mobile transaction coupon in a mobile terminal according to an exemplary embodiment of the present disclosure.

Referring to FIG. 5F, the mobile terminal 515 stores a received mobile transaction coupon in a 'refuel folder 517' of the generated folders as in FIG. 5E. At this point, the mobile terminal may output a mark 519 informing that a new mobile transaction coupon has been stored in the folder 517 or a mark representing the number of mobile transaction coupons stored in the folder together. In addition, the mobile terminal 515 may store information of the mobile transaction coupon in an alarm program, and then store the information in a folder corresponding to the mobile transaction coupon information. In addition, the mobile terminal 515 may apply the folder in which the mobile transaction coupon has been stored to a widget function or store the mobile transaction coupon in a specific folder of a message storage area.

FIG. 5G illustrates a screen of storing a mobile transaction coupon in a mobile terminal according to an exemplary embodiment of the present disclosure.

Referring to FIG. 5G, the mobile terminal assumes that it has received a mobile transaction coupon in a multimedia message format. The above-described exemplary embodiment of the present disclosure has explained the storing method for applying a received mobile transaction coupon to a widget function. Hereinafter, a method for storing a received mobile transaction coupon in a storage area corresponding to a reception type of the mobile transaction coupon is described. The reception type of the mobile transaction coupon may be a reception type using an e-mail, a reception type using a multimedia message, a reception type using a short message, and a reception type using a messenger. Accordingly, a storage area corresponding to a reception type may be a mobile transaction storage area of an e-mail storage area, a mobile transaction coupon storage area of a message reception box, and a mobile transaction coupon storage area of a data storage area.

That is, when receiving a mobile transaction coupon using a multimedia message, the mobile terminal stores the received mobile transaction coupon in a reception message storage area generally. Since the mobile transaction coupon is received in the form of an attached file of the multimedia message, the mobile transaction coupon is stored in the reception message storage area. A user of the mobile terminal should perform a process of searching for messages in the reception message storage area one by one in order to view the mobile transaction coupon after a predetermined time elapses.

To solve the above problem, when determining that a mobile transaction coupon is included in a received message (determining that the mobile transaction coupon is received), the mobile terminal according to an exemplary embodiment of the present disclosure stores a message including the received mobile transaction coupon in a specific storage area (a mobile transaction coupon storage area) of a message storage area. At this point, all of messages stored in the storage area are messages related to a mobile transaction coupon. The mobile terminal may generate a sub storage area of a mobile transaction coupon storage area to classify messages corresponding to the category of the mobile transaction coupon.

When receiving a mobile transaction coupon in the form using an e-mail, the mobile terminal stores the received mobile transaction coupon in the sub storage area of a storage area of an e-mail account.

FIGS. 6A-E illustrate a screen of executing a widget function corresponding to a mobile transaction coupon in a mobile terminal according to an exemplary embodiment of the present disclosure.

Figure 6C:
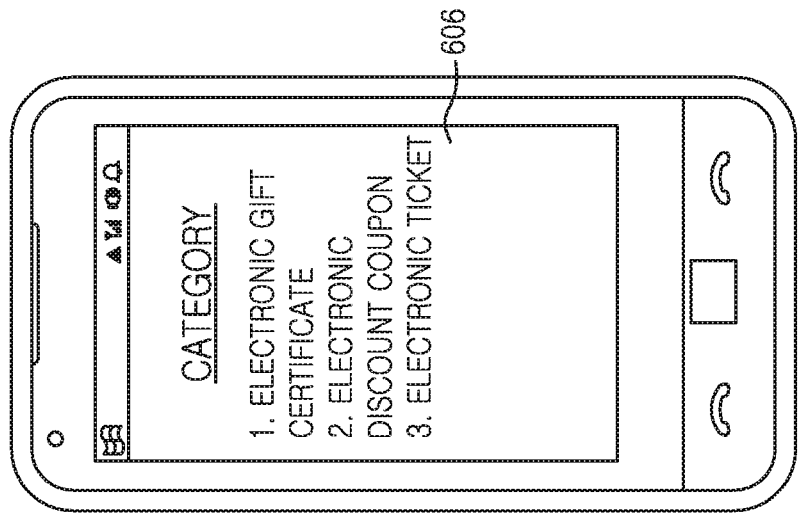
FIG. 6C illustrates a screen of classifying and outputting a mobile transaction coupon for each category in a mobile terminal according to an exemplary embodiment of the present disclosure.
Figure 6B:
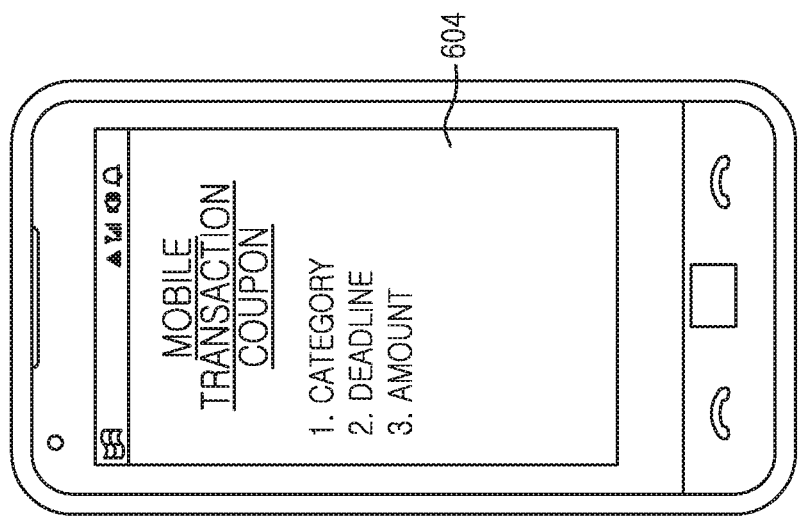
FIG. 6B illustrates a screen of executing a mobile transaction coupon widget in a mobile terminal according to an exemplary embodiment of the present disclosure.
Figure 6A:
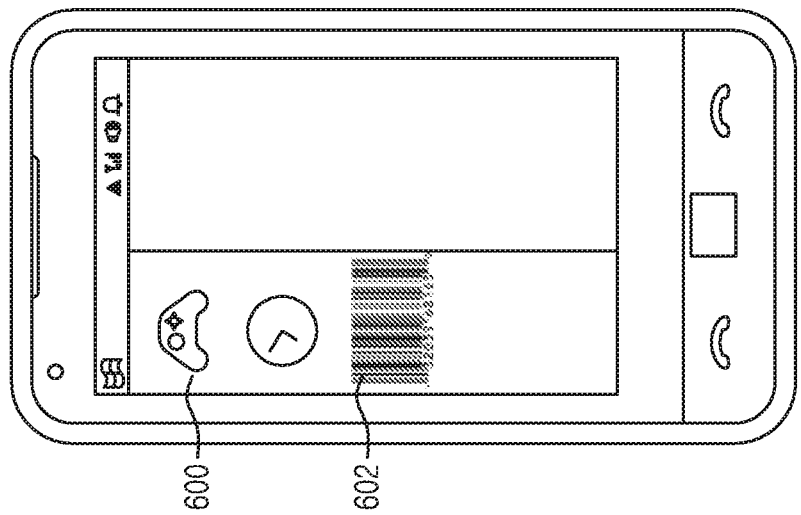
FIG. 6A illustrates a screen of outputting a mobile transaction coupon widget in a mobile terminal according to an exemplary embodiment of the present disclosure.

FIG. 6A illustrates a screen of outputting a mobile transaction coupon widget in a mobile terminal according to an exemplary embodiment of the present disclosure.

Referring to FIG. 6A, the mobile terminal outputs a widget bar 600 on a portion of an output screen. The widget bar 600 denotes a region including widgets providing a function of operating a specific application program using a small icon. As illustrated, the widget bar 600 may include a game widget, an alarm widget, and a mobile transaction widget 602 according to an exemplary embodiment of the present disclosure.

The mobile transaction coupon widget 602 denotes a widget for classifying folders that store received mobile transaction coupons for each category, and sorting the folders according to a user's selection.

FIG. 6B illustrates a screen of executing a mobile transaction coupon widget in a mobile terminal according to an exemplary embodiment of the present disclosure.

Referring to FIG. 6B, when executing the mobile transaction coupon widget on the output screen of FIG. 6A, the mobile terminal outputs a screen of selecting a folder in which a mobile transaction coupon is stored. As illustrated, the mobile terminal may classify and output mobile transaction coupons 604 stored in advance for each category, each deadline, and each sum of money.

FIG. 6C illustrates a screen of classifying and outputting a mobile transaction coupon for each category in a mobile terminal according to an exemplary embodiment of the present disclosure.

Referring to FIG. 6C, when receiving a request for classifying and outputting mobile transaction coupons for each category from a user, the mobile terminal outputs the category of the mobile transaction coupon. At this point, the category may be a category of a mobile transaction coupon stored in advance or a category of a mobile transaction coupon supported by the mobile terminal. The category item may be added, deleted, or changed by the user.

That is, the mobile terminal may output categories 606 of an electronic gift certificate, an electronic discount coupon, and an electronic ticket as categories of the mobile transaction coupons as illustrated.

Figure 6D:
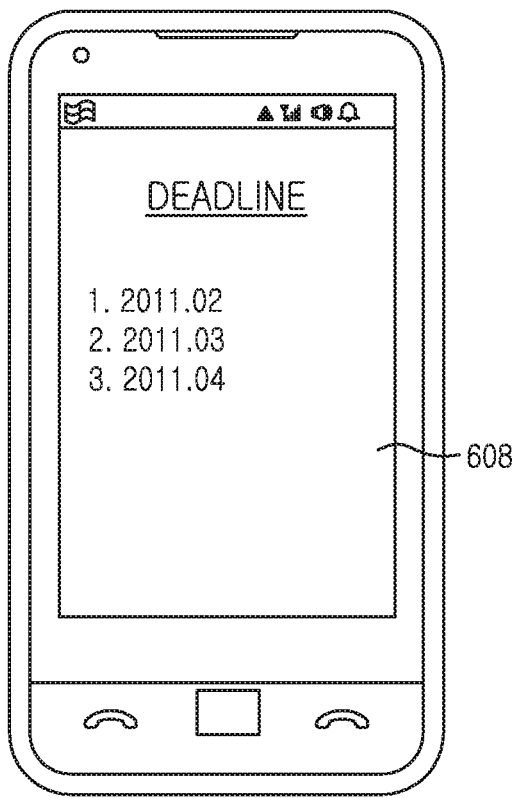
FIG. 6D illustrates a screen of classifying and outputting a mobile transaction coupon for each deadline in a mobile terminal according to an exemplary embodiment of the present disclosure.

FIG. 6D illustrates a screen of classifying and outputting a mobile transaction coupon for each deadline in a mobile terminal according to an exemplary embodiment of the present disclosure.

Referring to FIG. 6D, when receiving a request for classifying and outputting mobile transaction coupons stored in advance for each deadline from a user, the mobile terminal outputs a deadline item 608 of a mobile transaction coupon stored in advance. As illustrated, the mobile terminal may classify mobile transaction coupons for each deadline of each month or classify mobile purchase coupons using an actual deadline.

Figure 6E:
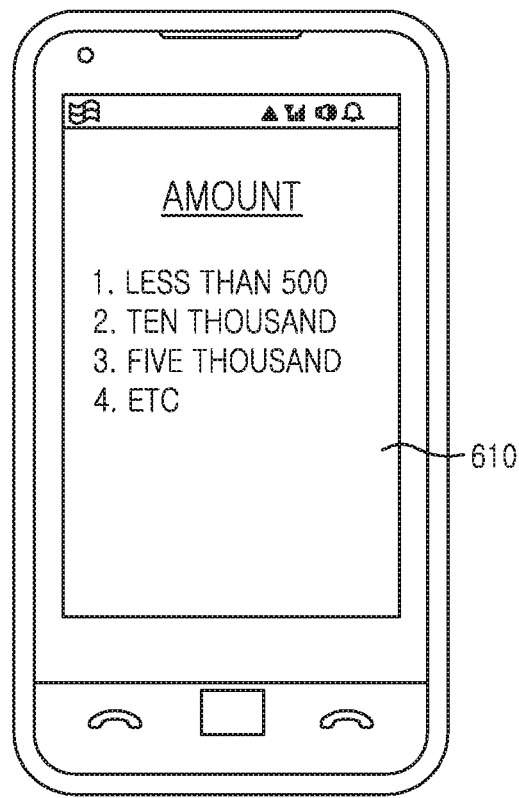
FIG. 6E illustrates a screen of classifying and outputting a mobile transaction coupon for each sum of money in a mobile terminal according to an exemplary embodiment of the present disclosure.

FIG. 6E illustrates a screen of classifying and outputting a mobile transaction coupon for each sum of money in a mobile terminal according to an exemplary embodiment of the present disclosure.

Referring to FIG. 6E, when receiving a request for classifying and outputting mobile transaction coupons stored in advance for each amount from a user, the mobile terminal outputs an amount item 610 of a mobile transaction coupon stored in advance. That is, as illustrated, the mobile terminal may classify amounts of the mobile transaction coupons into less than five thousand won, ten thousand won, fifty thousand won, etc. to classify the mobile transaction coupons stored in advance.

FIGS. 7A-F illustrate a process for outputting a refuel coupon via a widget function in a mobile terminal according to an exemplary embodiment of the present disclosure.

Figure 7C:
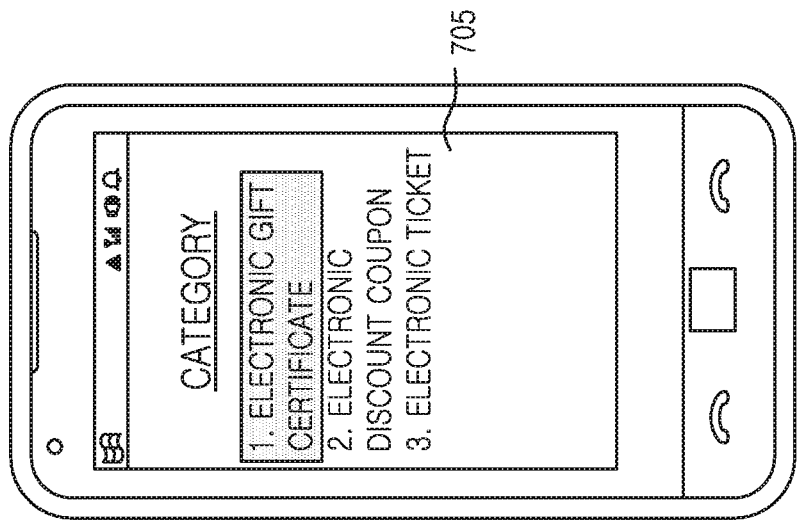
FIG. 7C illustrates a screen of classifying a mobile transaction coupon stored in advance for each category in a mobile terminal according to an exemplary embodiment of the present disclosure.
Figure 7B:
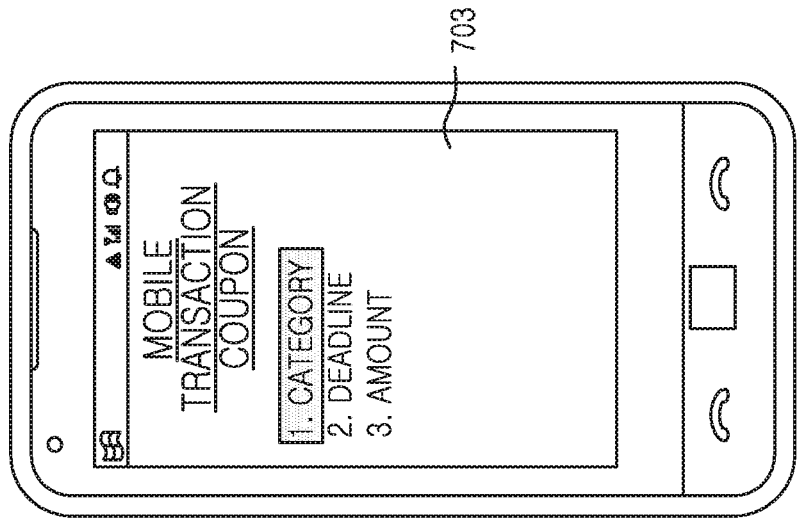
FIG. 7B illustrates a screen of executing a mobile transaction coupon widget in a mobile terminal according to an exemplary embodiment of the present disclosure.
Figure 7A:
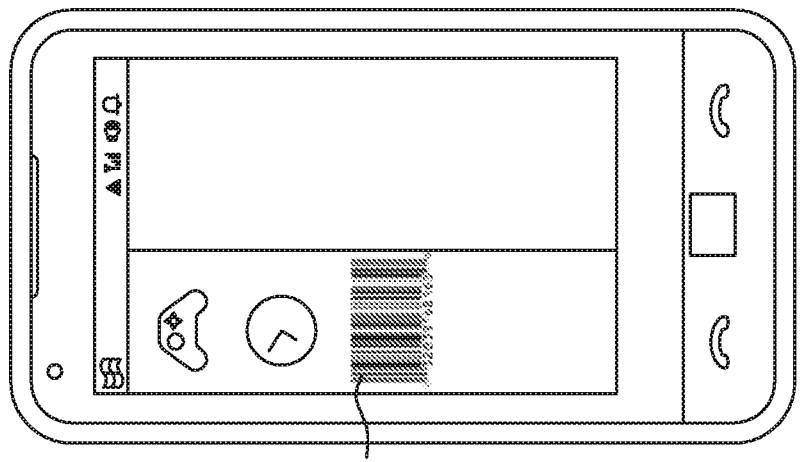
FIG. 7A illustrates a screen for providing a mobile transaction coupon widget in a mobile terminal according to an exemplary embodiment of the present disclosure.

FIG. 7A illustrates a screen for providing a mobile transaction coupon widget in a mobile terminal according to an exemplary embodiment of the present disclosure.

Referring to FIG. 7A, as described above, the mobile terminal outputs a widget bar on a portion of the output screen. The widget bar includes a mobile transaction coupon widget 701 for classifying folders that store received mobile transaction coupons for each category, and sorting the folders according to the user's selection.

FIG. 7B illustrates a screen of executing a mobile transaction coupon widget in a mobile terminal according to an exemplary embodiment of the present disclosure.

Referring to FIG. 7B, when a user of the mobile terminal executes a mobile transaction coupon widget, the mobile terminal outputs items of folders in which mobile transaction coupons are stored. The folder denotes a sorting method of mobile transaction coupons stored in advance. According to an exemplary embodiment of the present disclosure, the mobile terminal may classify the mobile transaction coupons 703 stored in advance for each category, each deadline, and each amount.

When the user of the mobile terminal selects a folder corresponding to a category, the mobile terminal may classify mobile transaction coupons stored in advance as a gift certificate, a discount coupon, or a ticket.

FIG. 7C illustrates a screen of classifying a mobile transaction coupon stored in advance for each category in a mobile terminal according to an exemplary embodiment of the present disclosure.

Referring to FIG. 7C, in the example where a user of the mobile terminal selects a category method among items (sorting methods) of output folders by executing a mobile transaction coupon widget, the mobile terminal outputs a subdivided type item of a mobile transaction coupon, which is a sub menu of the category method. At this point, the subdivided type item denotes a type of a mobile transaction coupon stored in advance. The mobile terminal outputs a subdivided type item 705 such as an electronic gift certificate, an electronic discount coupon, an electronic ticket, etc. When the user of the mobile terminal selects an item corresponding to an electronic gift certificate, the mobile terminal outputs a sub menu representing the type of an electronic gift certificate with respect to a mobile transaction coupon stored in advance as illustrated in FIG. 7D.

Figure 7F:
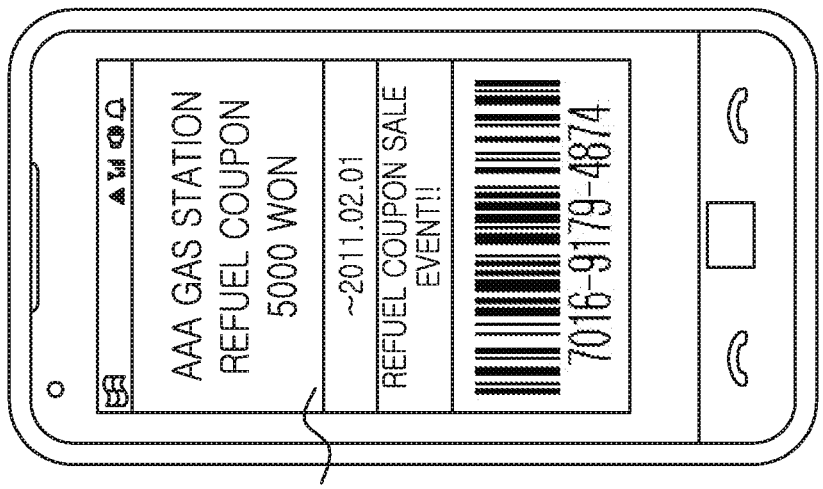
FIG. 7F illustrates a screen of outputting detailed information of a refuel coupon in a mobile terminal according to an exemplary embodiment of the present disclosure.
Figure 7E:
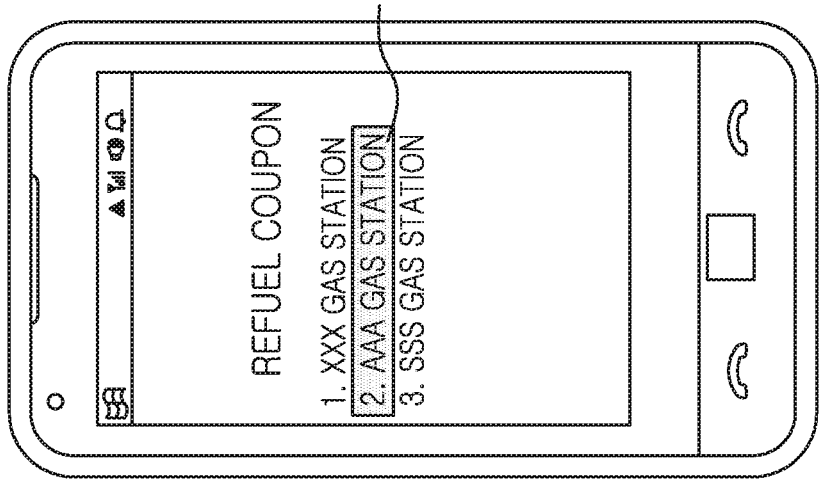
FIG. 7E illustrates a screen of classifying and outputting a refuel coupon among mobile transaction coupons stored in advance in a mobile terminal according to an exemplary embodiment of the present disclosure.
Figure 7D:
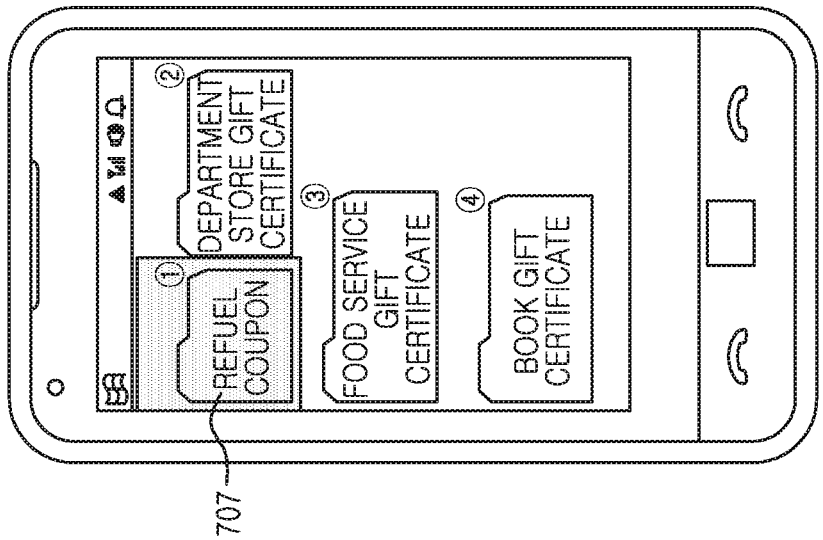
FIG. 7D illustrates a screen of discriminating a mobile transaction coupon corresponding to an electronic coupon stored in advance in a mobile terminal according to an exemplary embodiment of the present disclosure.

FIG. 7D illustrates a screen of discriminating a mobile transaction coupon corresponding to an electronic coupon stored in advance in a mobile terminal according to an exemplary embodiment of the present disclosure.

Referring to FIG. 7D, when a user of the mobile terminal selects an electronic gift certificate among sub menus of a category type, the mobile terminal outputs sub folders of a refuel coupon, a department store gift certificate, a food service gift certificate, a book gift certificate, a clothing gift certificate, etc. as a subdivided item of the electronic gift certificate. At this point, the mobile terminal may output the number of mobile transaction coupons stored in a relevant folder together as illustrated by a circled character.

When the user of the mobile terminal selects a refuel coupon folder 707 in which three mobile transaction coupons are stored, the mobile terminal outputs a list of stored refuel coupons as illustrated in FIG. 7E.

FIG. 7E illustrates a screen of classifying and outputting a refuel coupon among mobile transaction coupons stored in advance in a mobile terminal according to an exemplary embodiment of the present disclosure.

Referring to FIG. 7E, when a user of the mobile terminal selects a refuel coupon item among subdivided items of an electronic gift certificate, the mobile terminal discriminates a refuel coupon among mobile transaction coupons stored in advance, and outputs an item regarding each refuel coupon. That is, as illustrated, the mobile terminal outputs a list of refuel coupons regarding an XXX gas station, an AAA gas station, and an SSS gas station.

When the user of the mobile terminal selects one of the three refuel coupons (selects a refuel coupon corresponding to the AAA gas station 709), the mobile terminal outputs detailed information of the refuel coupon stored in advance as illustrated in FIG. 7F.

FIG. 7F illustrates a screen of outputting detailed information of a refuel coupon in a mobile terminal according to an exemplary embodiment of the present disclosure.

Referring to FIG. 7F, when a user of the mobile terminal selects a refuel coupon regarding the AAA gas station among items regarding refuel coupons stored in advance, the mobile terminal outputs detailed information 711 of a mobile transaction coupon that can be used at the AAA gas station.

As described above, the present disclosure is for managing a received mobile transaction coupon. The present disclosure may prevent the use period of a mobile transaction coupon from expiring by providing the use period of the mobile transaction coupon via an alarm program. In addition, the present disclosure may analyze a received mobile transaction coupon to store and inquire the mobile transaction coupon for each category (a type (a gift certificate, a discount coupon, a ticket, etc.)), a deadline, and an amount).

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. An electronic device comprising:
memory storing instructions;
a camera;
a display; and
at least one processor,
wherein the instructions stored in the memory, when executed by the at least one processor, cause the electronic device at least to:
receive a message including information on a first electronic ticket, wherein the first electronic ticket comprises at least one of a transportation ticket, a coupon, a membership card, or a payment card;
store, in the memory, a first information on the first electronic ticket based on the information included in the received message;
detect, via the camera of the electronic device, code information on a second electronic ticket, wherein the second electronic ticket comprises at least one of a transportation ticket, a coupon, a membership card, or a payment card;
store, in the memory, a second information on the second electronic ticket based on the detected code information;
identify a category of each of a plurality of electronic tickets including the first electronic ticket and the second electronic ticket, based on the first information on the first electronic ticket and the second information on the second electronic ticket; and
display, on the display, items corresponding to the plurality of electronic tickets based on the identified category.

2. The electronic device of claim 1, wherein the instructions stored in the memory, when executed by the at least one processor, cause the electronic device to display, on the display, one or more items corresponding to one or more other electronic tickets grouped together of a same category.

3. The electronic device of claim 1, wherein the instructions stored in the memory, when executed by the at least one processor, cause the electronic device to:
display, on the display in response to a first input, a list of electronic ticket categories;
receive a selection of one of the electronic ticket categories; and
display, on the display, one or more electronic tickets associated with the selected one of the electronic ticket categories.

4. The electronic device of claim 3, wherein the instructions stored in the memory, when executed by the at least one processor, cause the electronic device to delete, in response to at least one user input, one of the electronic ticket categories from the list.

5. The electronic device of claim 3, wherein the instructions stored in the memory, when executed by the at least one processor, cause the electronic device to:
receive a second input associated with an electronic ticket of the one or more electronic tickets; and
display, on the display, an image corresponding to the electronic ticket of the one or more electronic tickets.

6. The electronic device of claim 5, wherein the image corresponding to the one or more electronic tickets includes code information.

7. The electronic device of claim 1, wherein the instructions stored in the memory, when executed by the at least one processor, cause the electronic device to display, on the display, a notification based on a use period associated with at least one of the plurality of electronic tickets.

8. The electronic device of claim 1, wherein the instructions stored in the memory, when executed by the at least one processor, cause the electronic device to:
display an image corresponding to at least part of an electronic ticket among the plurality of electronic tickets.

9. A method for managing electronic tickets in an electronic device, comprising:
receiving, by the electronic device, a message including information on a first electronic ticket, wherein the first electronic ticket comprises at least one of a transportation ticket, a coupon, a membership card, or a payment card;
storing, by the electronic device, in a memory of the electronic device, a first information on the first electronic ticket based on the information included in the received message;
detecting, by the electronic device, via a camera of the electronic device, code information on a second electronic ticket, wherein the second electronic ticket comprises at least one of a transportation ticket, a coupon, a membership card, or a payment card;
storing, by the electronic device, in the memory of the electronic device, a second information on the second electronic ticket based on the detected code information;
identifying, by the electronic device, a category of each of a plurality of electronic tickets including the first electronic ticket and the second electronic ticket based on the first information and the second information; and
displaying, by the electronic device, on a display of the electronic device, items corresponding to the plurality of electronic tickets based on the identified category.

10. The method of claim 9, further comprising displaying one or more items corresponding to one or more other electronic tickets grouped together of a same category.

11. The method of claim 9, further comprising:
displaying, in response to a first input, a list of electronic ticket categories;
receiving a selection of one of the electronic ticket categories; and
displaying one or more electronic tickets associated with the selected one of the electronic ticket categories.

12. The method of claim 11, further comprising deleting, in response to at least one user input, one of the electronic ticket categories from the list.

13. The method of claim 11, further comprising:
receiving a second input associated with an electronic ticket of the one or more electronic tickets; and
displaying an image corresponding to the electronic ticket of the one or more electronic tickets.

14. The method of claim 13, wherein the image corresponding to the one or more electronic tickets includes code information.

15. The method of claim 9, further comprising:
displaying, on the display, a notification based on a use period associated with at least one of the plurality of electronic tickets.

16. The method of claim 9, wherein displaying the items corresponding to the plurality of electronic tickets comprises:
displaying an image corresponding to at least part of an electronic ticket among the plurality of electronic tickets.

17. An electronic device comprising:
memory storing instructions;
a camera;
a display; and
at least one processor,
wherein the instructions stored in the memory, when executed by the at least one processor, cause the electronic device at least to:
execute, by the electronic device, a mobile transaction program configured to organize a plurality of electronic tickets; and
display, by the electronic device, via an execution screen of the mobile transaction program, the plurality of electronic tickets, including a first electronic ticket and a second electronic ticket, organized by categories of a transportation ticket, a coupon, a membership card, and a payment card,
wherein the first electronic ticket is obtained by analyzing a message including information on the first electronic ticket received by a message application of the electronic device,
wherein the second electronic ticket is obtained by capturing a code image by the camera of the electronic device, and
wherein each of the first electronic ticket and the second electronic ticket is stored based on a respective category thereof.

18. The electronic device of claim 7, wherein the instructions stored in the memory, when executed by the at least one processor, cause the electronic device to:
determine storage positions of the plurality of electronic tickets based on the identified category of each of the plurality of electronic tickets;
display, on the display, the items corresponding to the plurality of electronic tickets at the storage positions; and
display, on the display, the notification separately from the storage positions.

19. The method of claim 15, further comprising:
determining storage positions of the plurality of electronic tickets based on the identified category of each of the plurality of electronic tickets;
displaying, on the display, the items corresponding to the plurality of electronic tickets at the storage positions; and
displaying, on the display, the notification separately from the storage positions.

\* \* \* \* \*